United States Patent
Nakamura

(10) Patent No.: US 11,465,554 B2
(45) Date of Patent: Oct. 11, 2022

(54) LAMP UNIT AND VEHICLE LAMP

(71) Applicant: Koito Manufaturing Co., LTD., Tokyo (JP)

(72) Inventor: Hiromi Nakamura, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 17/431,655

(22) PCT Filed: Feb. 13, 2020

(86) PCT No.: PCT/JP2020/005506
§ 371 (c)(1),
(2) Date: Aug. 17, 2021

(87) PCT Pub. No.: WO2020/170922
PCT Pub. Date: Aug. 27, 2020

(65) Prior Publication Data
US 2022/0134944 A1 May 5, 2022

(30) Foreign Application Priority Data

Feb. 18, 2019 (JP) .............................. JP2019-026250

(51) Int. Cl.
*B60Q 1/30* (2006.01)
*F21S 43/14* (2018.01)
(Continued)

(52) U.S. Cl.
CPC .............. *B60Q 1/302* (2013.01); *F21S 43/14* (2018.01); *F21S 43/15* (2018.01); *F21S 43/26* (2018.01)

(58) Field of Classification Search
CPC ......... F21V 41/26; G02B 6/001; G02B 6/002; G02B 6/003; F21S 43/15; F21S 43/26; B60Q 1/302
See application file for complete search history.

(56) References Cited

U.S. PATENT DOCUMENTS

2013/0027976 A1\* 1/2013 Robbins ................... B60Q 3/78
257/E33.068
2014/0003076 A1 1/2014 Suganumata et al.
(Continued)

FOREIGN PATENT DOCUMENTS

| JP | 2008-059882 A | 3/2008 |
| JP | 2015-220026 A | 12/2015 |
| JP | 2018-006315 A | 1/2018 |

OTHER PUBLICATIONS

Written Opinion of the International Searching Authority issued for International Application No. PCT/JP2020/005506, dated Apr. 14, 2020, 6 pages.

*Primary Examiner* — Jong-Suk (James) Lee
*Assistant Examiner* — Christopher E Dunay
(74) *Attorney, Agent, or Firm* — Lewis Rice LLC

(57) ABSTRACT

Problem: To provide a light source unit that can be housed in a narrow space, can be curved to match the shape of the space, and can emit linear light in a desired lighting pattern, and a vehicle lamp equipped with this light source unit.

Solution: A light source unit 1 is comprised of a strip of translucent film 3 in which LEDs 2 are embedded and strips of lenses 4 that cover the translucent film 3 on the top and back surfaces thereof. The lenses 4 are provided with a light collecting portion 41 that collects the light from the LEDs 2 and a reflective portion 42 that changes the direction of the light incident from the light collecting portion 41 on the surface opposite the surface on which the light collecting portion 41 is provided. The LEDs 2 are arranged linearly along the longitudinal direction of the translucent film 3, and each can be independently controlled for lighting.

5 Claims, 8 Drawing Sheets

Front of the Vehicle ⟵⟶ Rear of the Vehicle

(51) Int. Cl.
*F21S 43/15* (2018.01)
*F21S 43/20* (2018.01)

(56) References Cited

U.S. PATENT DOCUMENTS

| | | | |
|---|---|---|---|
| 2014/0211449 A1* | 7/2014 | Nomura | F21S 43/14 362/84 |
| 2015/0003092 A1* | 1/2015 | Gebauer | F21S 43/243 362/511 |
| 2015/0345740 A1 | 12/2015 | Watanabe et al. | |
| 2019/0078747 A1* | 3/2019 | Wu | F21S 43/239 |
| 2019/0093847 A1* | 3/2019 | Okada | F21S 43/243 |
| 2019/0162379 A1* | 5/2019 | Stormberg | G02B 19/0057 |

\* cited by examiner

Front of the Vehicle ⟷ Rear of the Vehicle (b)

(a)

Front of the Vehicle ⟷ Rear of the Vehicle (b)

Front of the Vehicle ⟷ Rear of the Vehicle

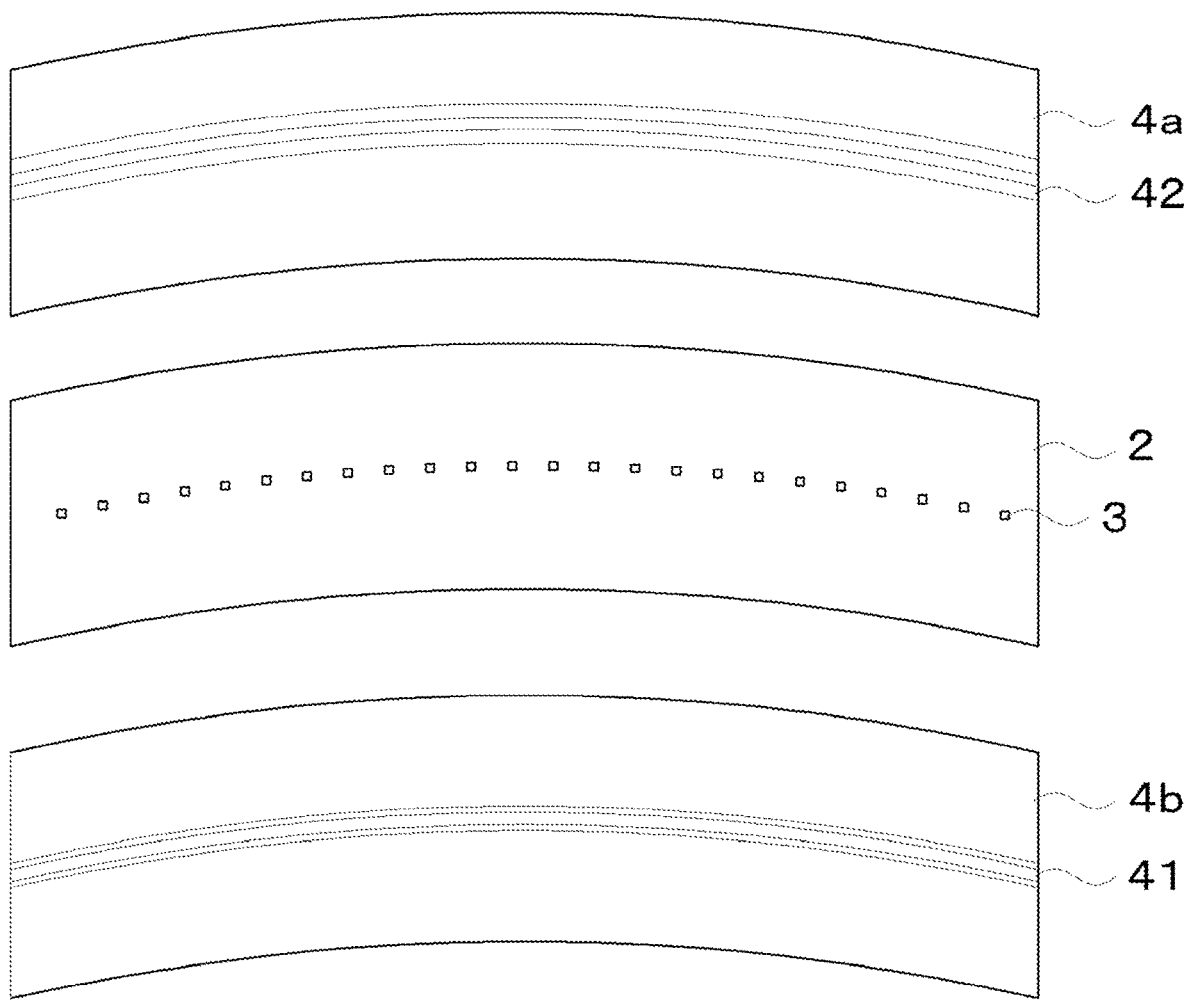
F I G. 7

LAMP UNIT AND VEHICLE LAMP

CROSS REFERENCE TO RELATED APPLICATION(S)

This application is a § 371 U.S. National Phase of International Application Serial No.: PCT Application No.: PCT/R2020/005506 filed Feb. 13, 2020, which in turn claims priority to Japanese Patent Application Serial No.: 2019-026250, filed Feb. 18, 2019. The entire disclosure of all the above documents is herein incorporated by reference.

TECHNICAL FIELD

The present invention relates to a lamp unit using a film light source and a vehicle lamp.

BACKGROUND ART

Vehicle lamps provided not only with high performance but also novel and excellent appearances have been developed in recent years. For example, the effective use of a high-mounted stop lamp (HMSL), which is installed independently of rear combination lamps (RCLs) consisting of tail lamps (TLs) and stop lamps (SLs), leads to the improvement of the overall design of the rear of the vehicle.

Compared to RCLs, HMSLs are often installed in areas where space for installation is limited, such as near the roof or inside spoilers. In such a case, a technology can be used to emit light from the light source at a desired position using a light guide. For example, Patent Documents 1 and 2 disclose technologies that mount a light guide or a light pipe, which is a line light guide, on a light source unit to guide light from the light source through the light guide and emit the light from a side of the light guide at a desired position.

CITATION LIST

Patent Literature

Patent Document 1: Japanese Published Unexamined Patent Application No. 2014-008876
Patent Document 2: Japanese Published Unexamined Patent Application No. 2018-063890

SUMMARY OF THE INVENTION

Problems to Be Solved by the Invention

According to the technologies described in Patent Documents 1 and 2, the light source unit, including the light guide, requires a certain thickness. Accordingly, if the light source unit is disposed inside a thin, curved rear spoiler, there arises the problems of putting pressure on the space inside the rear spoiler and interfering with the wiring of the light source unit and the arrangement of other components.

The present invention has been made in view of the foregoing circumstances, and one object thereof is to provide a light source unit and a vehicle lamp that can be mounted in a thin and curved location, and realize novel and good-looking linear light emission.

Means to Solve the Problems

In order to solve the above-described problems, a light source unit of the present invention is characterized by comprising a translucent film on which light sources are mounted, and a lens that covers a film surface of the translucent film, wherein the lens includes a light collecting portion for allowing light from the light sources to enter the lens and a reflective portion for changing a direction of the light entering at the light collecting portion.

Furthermore, the translucent film and the lens are formed in strips, the plurality of light sources are arranged in a row in a longitudinal direction of the translucent film, and the light collecting portion and the reflective portion of the lens are formed as grooves that extend along the light sources in the longitudinal direction.

Moreover, the plurality of lenses may be provided to cover the translucent film on an upper or lower surface thereof, the light collecting portions of the plurality of lenses may be arranged to oppose the light sources, and the light sources may be configured to emit light toward the light collecting portions.

The lenses may also include a retaining portion that retains the translucent film around the light sources, and they are formed to curve in a longitudinal direction and/or a thickness direction.

Advantageous Effects of Invention

The light source unit and the vehicle lamp of the present invention allow for emitting light in a desired direction while reducing the thickness of the light source unit because a translucent film embedded with light sources is used and the direction of the light from the light sources is changed by the reflective surfaces of the lenses. In addition, since the independent light sources are arranged in a row in the translucent film, each of the light sources can be controlled to create a variety of light distribution patterns and realize novel looking linear light emission.

BRIEF DESCRIPTION OF THE DRAWINGS

FIG. 5(*b*) is a plan view of the rear spoiler that mounts the vehicle lamp of the present invention.
FIG. 6(*b*) is a cross-sectional view of the vehicle lamp of the present invention mounted in the rear spoiler shown in FIG. 5 taken on line A-A.
FIG. 7 is a view showing a variant of the light source unit of the present invention.

DETAILED DESCRIPTION OF EMBODIMENTS

The following describes embodiments of a light source unit of the present invention with reference to the drawings. In each of the drawings, identical symbols designate identical or similar components.

Figure 1:
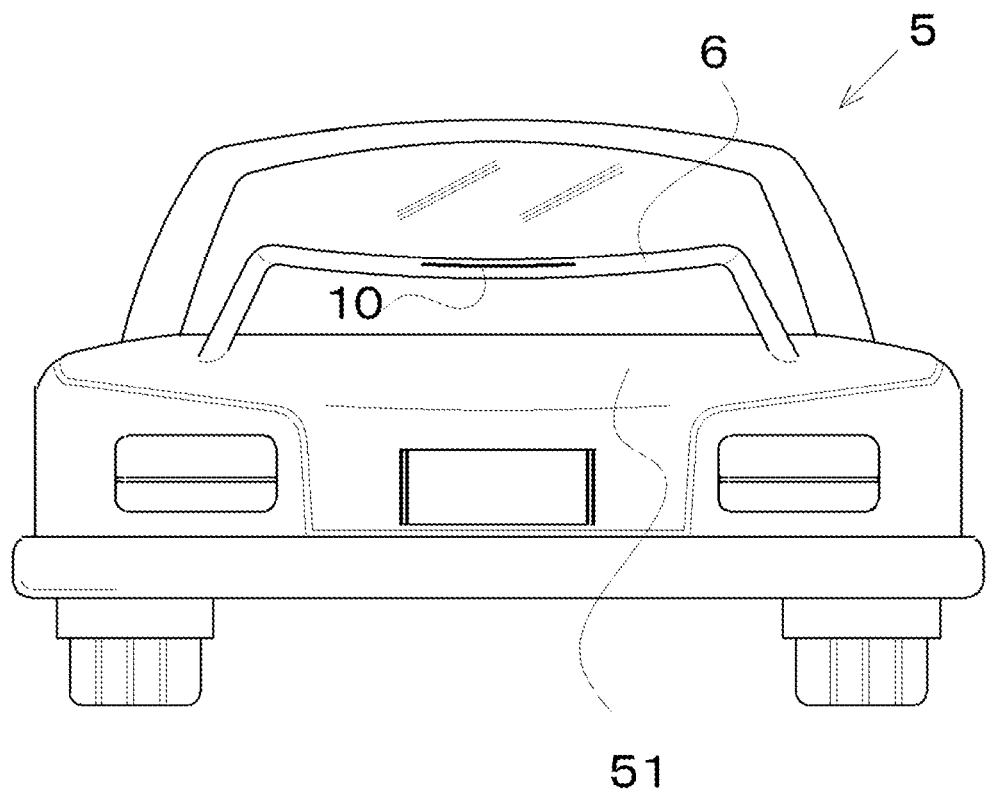
FIG. 1 is a view showing a vehicle lamp of the present invention mounted on a vehicle.

FIG. 1 shows that a vehicle lamp 10 that mounts a light source unit 1 of the present invention is installed on a vehicle. The vehicle 5 of this embodiment has a rear spoiler 6 that is mounted on a trunk lid 51 at the rear of the vehicle and extends in the width direction of the vehicle. The vehicle lamp 10, which is an HMSL in which the light source unit 1 of the present invention is mounted, is provided at the rear of the body of the rear spoiler 6. It should be noted that the body of the rear spoiler 6 is formed in a hollow shape, for example, using a synthetic resin material, and is curved in the center portion in the vehicular width direction.

Figure 2:
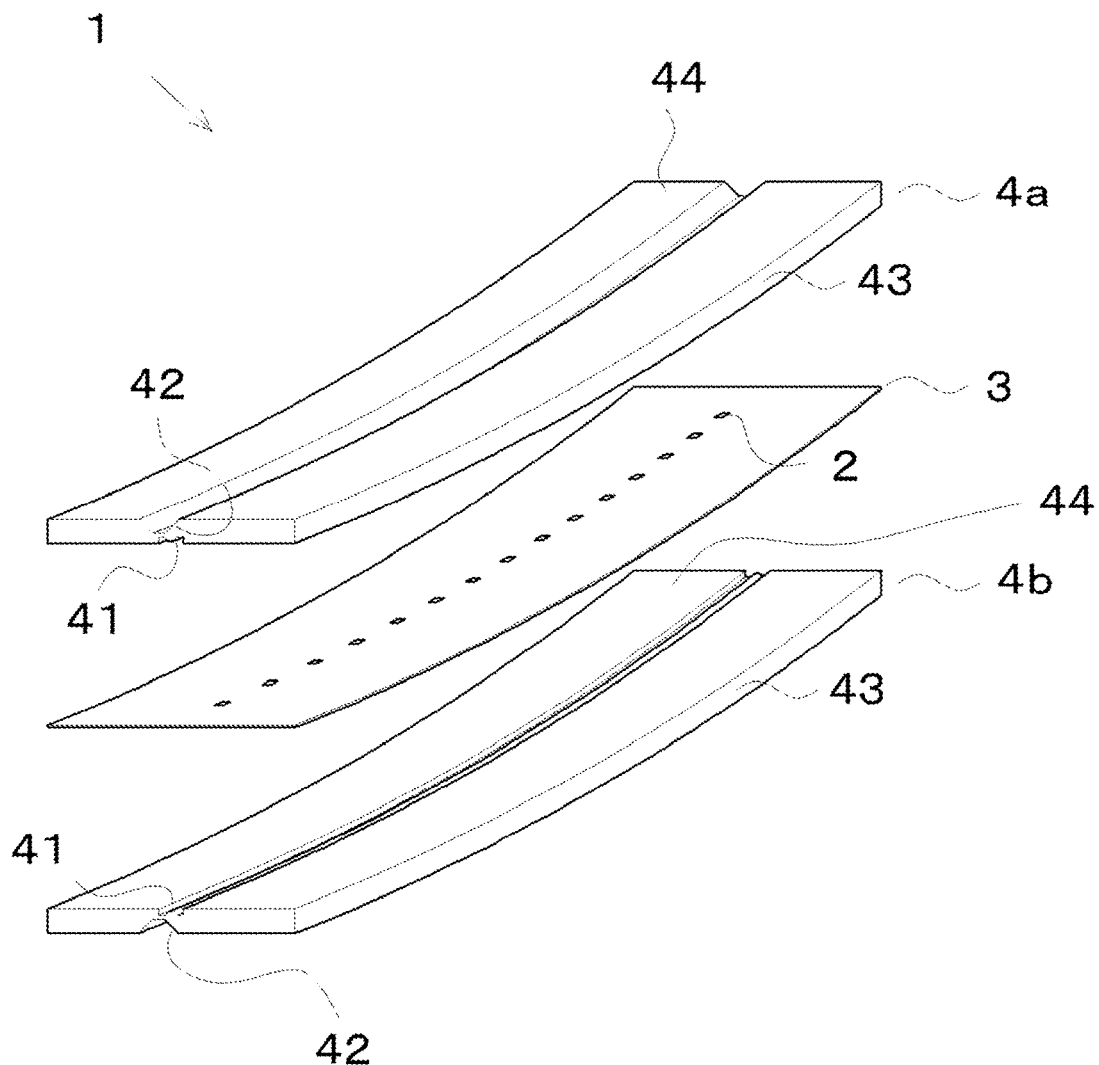
FIG. 2 is a perspective view of a light source unit of the present invention.

FIG. 2 shows the configuration of the light source unit 1 of the present invention. The light source unit 1 of the present invention is comprised of LEDs 2 serving as light sources, a strip of translucent film 3 having the plurality of LEDs 2 arranged therein in a row, and a strip of lens 4a and a strip of lens 4b arranged to cover the upper and lower surfaces of the translucent film 3. The lens 4a and the lens 4b each have a light collecting portion 41 and a reflective portion 42 formed therein as grooves that extend in the longitudinal direction and oppose the LEDs 2 arranged in a row. Each of the lens 4a, the translucent film 3, and the lens 4b is formed with a convex curvature toward the bottom of the vehicle, with the axis of symmetry at the center thereof in the width direction.

The LEDs 2 are minute LED chips of an approximately 0.3 mm×0.3 mm square or a circle of approximately 0.3 mm diameter that can be individually controlled to turn on and off according to a desired light distribution pattern. For example, to control the turning on and off of the lights, it is contemplated to divide the LEDs into groups and cause each group to turn on and off or blink, and/or cause the LEDs to turn on and off in a sequential manner.

The translucent film 3 is embedded with the LEDs 2, electrodes (not shown) for energizing the LEDs 2, and metal wiring (not shown) connected to the electrodes. The translucent film 3 is formed from a flexible PET material or other resin with a thickness of about 0.3 mm, and the plurality of embedded LEDs 2 are arranged in the longitudinal direction at intervals (pitches) of at least 2.5 mm.

Figure 3:
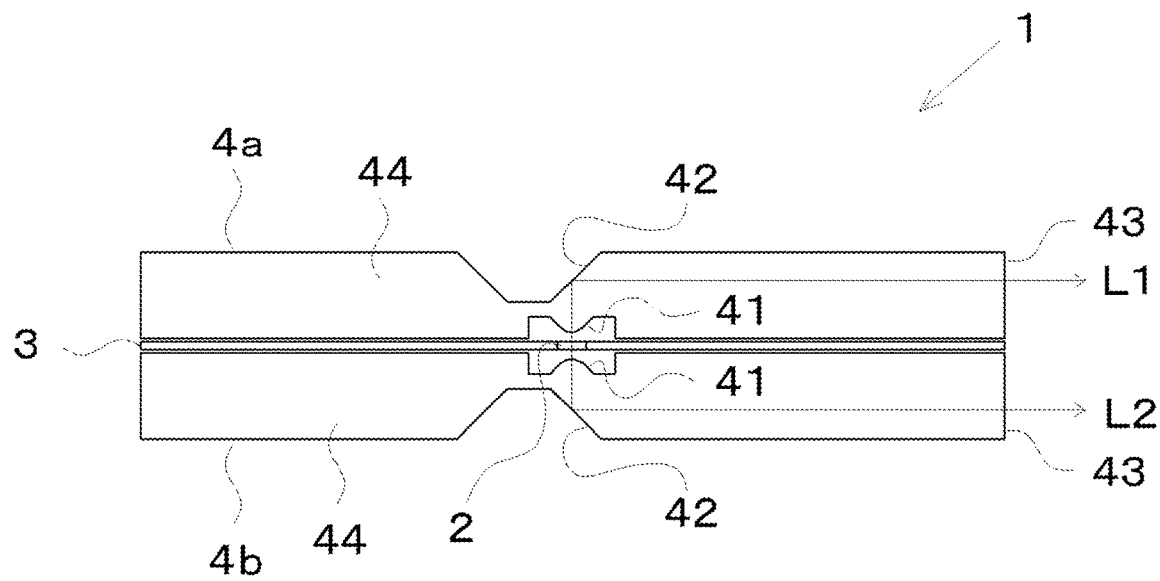
FIG. 3 is a side view of the light source unit of the present invention.

FIG. 3 shows a side view of the light source unit 1 of the present invention. The lenses 4a and 4b are plate-shaped lenses made of a transparent resin material, such as acrylic, and the lenses cover the translucent film 3 so that the film is sandwiched between the lenses on its upper and lower surfaces. Provided in the center portion in the width direction of each lens 4 are a light collecting portion 41 that collects light from the LEDs 2 and allows it to enter the lens 4, a reflective portion 42 that reflects the lights L1 from the light collecting portion 41, and an emitting portion 43 that emits the light L1, L2 reflected by the reflective portion 42 toward the rear of the vehicle.

The light collecting portions 41 is located in the center portion of the width direction of each lens 4 where they oppose the LEDs 2, and have a convex shape projecting toward the LEDs 2. In addition, the reflective portion 42 is formed on the surfaces opposite the surface on which the light collecting portion 41 is formed, the reflective portion 42 being inclined toward the emitting portion 43. In addition, the lenses 4 have a retaining portion 44 formed in a location starting at its center in the width direction of the lenses 4 and extending toward the front of the vehicle in order to retain the translucent film 3. The light emitted by the LEDs 2 passes through the translucent film 3 in both directions of the front and back surfaces, and enters the light collection portion 41 of each of the lenses 4a and 4b. Preferably, the thickness of each of the lenses 4a and 4b is about 3 to 4 mm, in which case, the thickness of the light source unit 1 should be about 6 to 8 mm.

Figure 4:
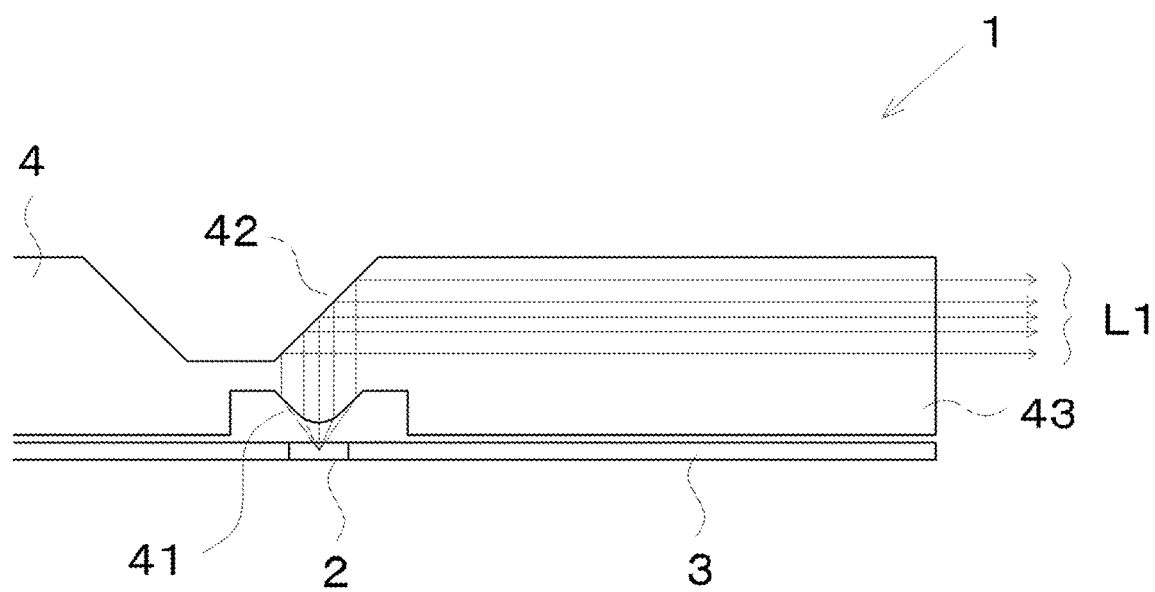
FIG. 4 is an explanatory view indicating the travel of light in the light source unit of the present invention.

FIG. 4 shows an enlarged side view of one of the lenses 4a and 4b. The light L1 emitted from the LEDs 2 is transmitted through the translucent film 3, collected by the light collecting portion 41, and incident on the lens 4. After being incident on the lens, the light becomes collimated and travels to the reflector 42. Then, the light L1 is totally reflected by the reflective portion 42 and travels parallel to the translucent film 3 to be emitted from the emitting portion 43. The LEDs 2 are arranged in a linear pattern at a narrow pitch along the longitudinal direction of the translucent film 3, and as the light collecting portion 41 and the reflective portion 42 are formed at positions opposing the LEDs 2, the light emitted by the light source unit 1 is observed as linear light when seen from the rear of the vehicle.

Figure 5:
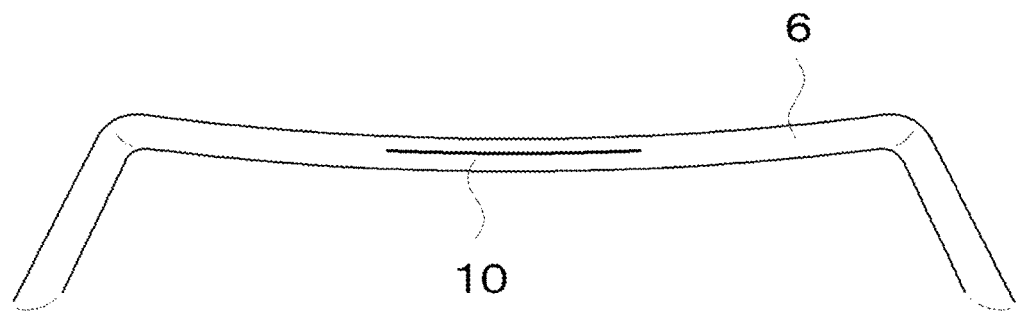
FIG. 5(*a*) is an elevation view of a rear spoiler that mounts the vehicle lamp of the present invention as seen from behind the vehicle.
Figure 5:
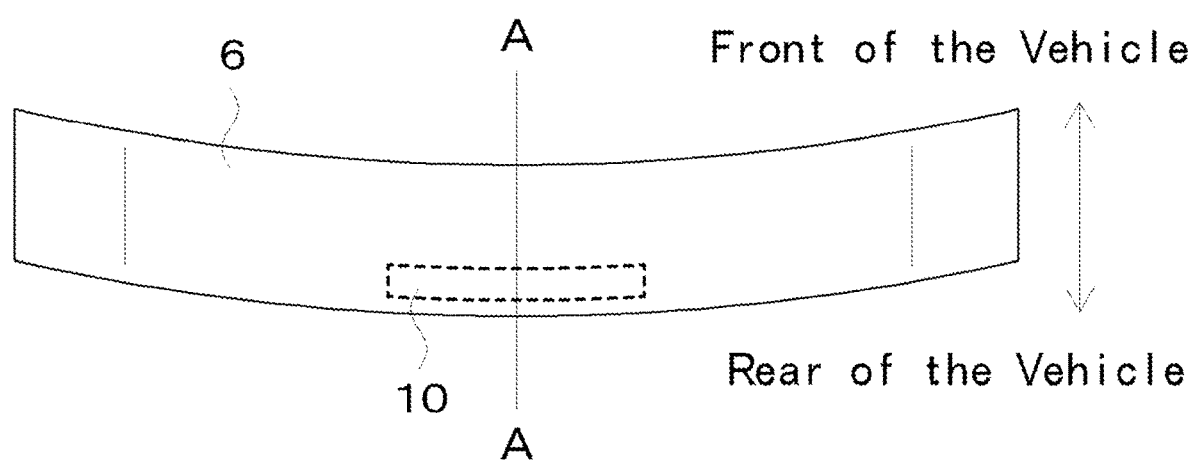

FIG. 5 is a view showing how the vehicle lamp 10, in which the light source unit 1 of the present invention is mounted, is disposed in the rear spoiler 6. As shown in FIGS. 5(a) and 5(b), the vehicle lamp 10 is disposed at the center of the rear spoiler 6 in the width direction of the vehicle so as to emit light from the light source unit 1 toward the rear of the vehicle. In this case, the vehicle lamp 10 is curved to comply with the shape of the rear spoiler 6. It should be noted that the length of the vehicle lamp 10 in the width direction of the vehicle is preferably about 500-600 mm.

Figure 6:
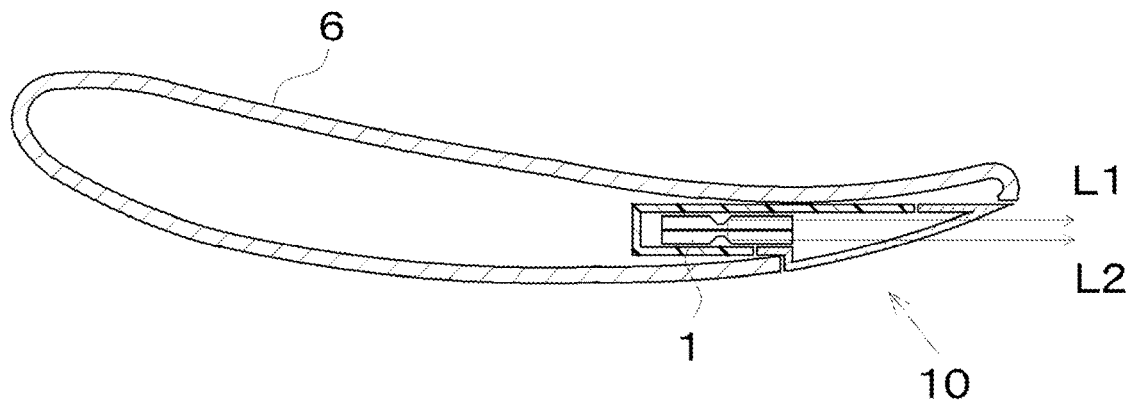
FIG. 6(*a*) is a cross-sectional view of the rear spoiler shown in FIG. 5 taken on line A-A.
Figure 6:
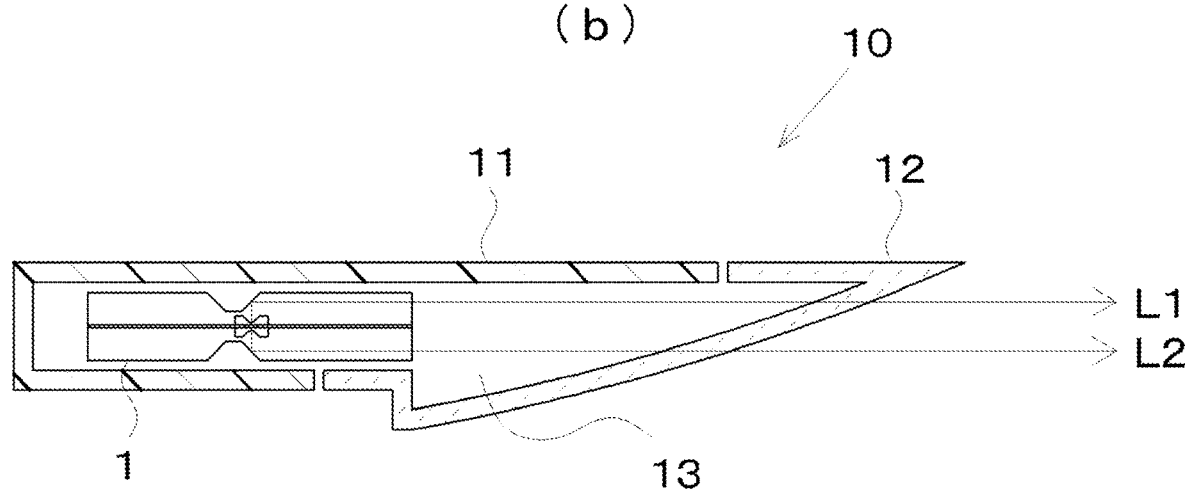

As shown in FIG. 6(a), the rear spoiler 6 is formed in a tapered shape that becomes thinner from its vehicular front portion toward its vehicular rear portion, and an opening is formed on the thinner side thereof, with the vehicle lamp 10 assembled in the opening. The vehicle lamp 10 has a lamp body 11, an outer cover 12 made of a translucent resin material, and a lamp chamber 13 formed between the lamp body 11 and the outer cover 12, and the light source unit 1 is housed in the light chamber 13. Then, as shown in FIG. 6(b), the lights L1 and L2 emitted from the light source unit 1 are transmitted through the outer cover 12 and travel toward the rear of the vehicle. The LEDs 2 are arranged in a linear pattern at a narrow pitch along the longitudinal direction of the translucent film 3, and as the light collecting portions 41 and the reflective portions 42 are formed at positions opposing the LEDs 2, the light emitted by the vehicle lamp 10 is observed as linear light when seen from the rear of the vehicle.

According to the light source unit and the vehicle lamp with the above structure, the thickness of the light source unit 1 can be reduced and the light source unit 1 can be disposed in a limited space because a translucent film embedded with LEDs 2 is used and the direction of the light from the LEDs 2 that is incident on and collected by the light collecting portions 41 is changed by the reflective portions 42 of the lenses 4. In addition, as the independently controllable LEDs 2 are arranged in a row in the translucent film, the LEDs 2 can be controlled to form a desired light distribution pattern. Furthermore, also provided is the effect of having the translucent film 3 interposed between the plurality of lenses 4a and 4b to securely retain the translucent film 3 and allow light to enter the lenses without waste.

The light source unit and the vehicle lamp of the present invention are not limited to the foregoing embodiment, but can be changed and implemented as required, so long as such changes do not depart from the spirit of the present invention.

Figure 8:
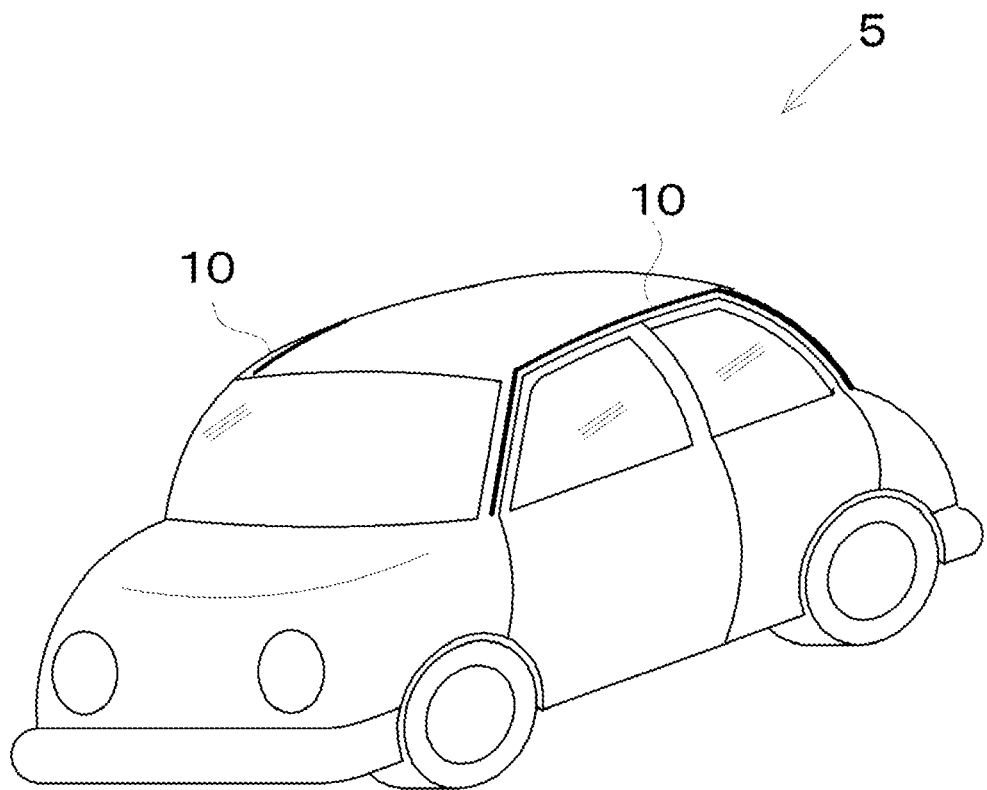
FIG. 8 is a view showing of another embodiment of the vehicle lamp of the present invention.

For example, instead of being installed in HMSLs, the light source unit can be installed in side turn signal lamps, clearance lamps, high-mounted signal lamps, daytime running lamps, TLs, SLs, RCLs, self-driving indicator lamps, etc. As shown in FIG. 7, it is also possible to form the light source unit 1 by curving it in the width direction thereof. In this case, it is preferable to arrange the LEDs 2 in a curve to match the shape of the translucent film 3, and also to curve the light collecting portions 41 and the light reflective portions 42 of the lenses 4a and 4b to match the positions of the LEDs 2. In addition, as shown in FIG. 8, it is also possible to install vehicle lamps 10 of the present invention on edges of the roof or the pillars of the vehicle 5 so that they may serve a function of extending hospitality to the user, for example, by turning on and off the lamps in an unique lighting pattern according to the event, such as, when the vehicle 5 is unlocked.

LIST OF REFERENCE NUMERALS

1 Lamp unit
10 Vehicle lamp
11 Lamp body
12 Outer cover
13 Lamp chamber
2 LED
3 Translucent film
4 Lens
41 Light collecting portion
42 Reflective portion
43 Emitting portion
44 Retaining portion
5 Vehicle
51 Trunk lid
6 Rear spoiler

The invention claimed is:

1. A light source unit for use in a vehicle lamp, the light source unit characterized by comprising:
a translucent film on which light sources are mounted; and
a lens that covers a film surface of the translucent film,
wherein the lens includes a light collecting portion for allowing light from the light sources to enter the lens and a reflective portion for changing a direction of the light entering at the light collecting portion,
wherein the translucent film and the lens are formed in strips,
wherein the light sources are arranged in a row in a longitudinal direction of the translucent film, and
wherein the light collecting portion and the reflective portion of the lens are formed as grooves that extend along the light sources in the longitudinal direction.

2. The light source unit of claim 1,
wherein the lens is provided to cover the translucent film on an upper or lower surface thereof,
wherein the lens is arranged so that the light collecting portions oppose the light sources, and
wherein the light sources emit light toward the light collecting portions.

3. The light source unit of claim 1, wherein the lens includes a retaining portion that retains the translucent film around the light sources.

4. The light source unit of claim 1, wherein the lens is formed to curve in a longitudinal direction and/or a thickness direction.

5. A vehicle lamp comprising the light source unit of claim 1.

* * * * *